(12) United States Patent
Bowman, Jr. et al.

(10) Patent No.: US 9,260,271 B1
(45) Date of Patent: Feb. 16, 2016

(54) KNOT TYING DEVICES (71) Applicants: David Andrew Bowman, Jr., Bradenton, FL (US); Joel Anthony Jenkins, Wesley Chapel, FL (US)

(72) Inventors: David Andrew Bowman, Jr., Bradenton, FL (US); Joel Anthony Jenkins, Wesley Chapel, FL (US)

(73) Assignee: University of South Florida, Tampa, FL (US)

( * ) Notice: Subject to any disclaimer, the term of this patent is extended or adjusted under 35 U.S.C. 154(b) by 232 days.

(21) Appl. No.: 14/024,049

(22) Filed: Sep. 11, 2013

Related U.S. Application Data

(60) Provisional application No. 61/699,478, filed on Sep. 11, 2012.

(51) Int. Cl.
*B65H 69/04* (2006.01)
*A01K 91/04* (2006.01)
(52) U.S. Cl.
CPC ............... *B65H 69/04* (2013.01); *A01K 91/04* (2013.01)
(58) Field of Classification Search
CPC ....... A01K 91/04; A01K 91/047; B65H 69/04

USPC ............................................................ 289/17
See application file for complete search history.

(56) References Cited

U.S. PATENT DOCUMENTS

| 2,783,571 | A | * | 3/1957 | Stilwell ........................... 289/17 |
| 2,893,159 | A | * | 7/1959 | Baird ............................ 43/44.85 |
| 3,057,109 | A | * | 10/1962 | Houk ............................ 43/44.85 |
| 3,700,272 | A | * | 10/1972 | Bauer ............................. 289/17 |
| 3,877,737 | A | | 4/1975 | Chappell et al. |
| 4,573,719 | A | | 3/1986 | Aldridge |
| 4,714,281 | A | | 12/1987 | Peck |
| 5,971,447 | A | | 10/1999 | Steck |
| 6,419,283 | B1 | | 7/2002 | Thomas et al. |
| 6,817,634 | B2 | | 11/2004 | Champion |
| 7,494,162 | B1 | * | 2/2009 | Howell ............................ 289/17 |
| 2007/0182157 | A1 | * | 8/2007 | Carrier ............................ 289/17 |

* cited by examiner

*Primary Examiner* — Shaun R Hurley
(74) *Attorney, Agent, or Firm* — Thomas | Horstemeyer, LLP (57) ABSTRACT

In some embodiments, a knot tying device includes a body that defines a wheel slot and inner passages that lead to the wheel slot and a wheel that fits and can be rotated within the wheel slot, the wheel including openings that can be aligned with the inner passages of the body, wherein one or more strands of material can be fed through the inner passages of the body and the openings of the wheel and the wheel can then be rotated relative to the body to twist the one or more stands.

19 Claims, 10 Drawing Sheets

KNOT TYING DEVICES

CROSS-REFERENCE TO RELATED APPLICATION(S)

This application claims priority to U.S. Provisional Application Ser. No. 61/699,478, filed Sep. 11, 2012, which is hereby incorporated by reference herein in its entirety.

BACKGROUND

Knots are useful in various situations. As an example, knots are often used in fishing to tie a hook to a fishing line or to tie two lengths of fishing line together.

While manually tying such knots is not necessarily difficult, one must first be taught how to tie such knots. In addition, even when one has learned how to tie the knots, it may not be easy to tie them under all circumstances. For example, it may be more difficult to tie a knot when one is on a rocking boat. Furthermore, when one has underdeveloped or compromised motor skills, for example due to age or disability, tying such knots can be challenging.

From the above discussion, it can be appreciated that it would be desirable to have means for assisting people in tying knots.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have means for assisting people in tying knots. Disclosed herein are knot tying devices that are configured to at least partially automate the knot tying process so that those who have not learned how to manually tie knots or those who have difficulty tying knots due to underdeveloped or compromised motor skills can do so more easily. In some embodiments, the devices can be used to tie an object to a strand of material, such as a fishing line. In other embodiments, the devices can be used to tie two strands of material, such as two lengths of fishing line, together.

In the following disclosure, various specific embodiments are described. It is to be understood that those embodiments are example implementations of the disclosed inventions and that alternative embodiments are possible. All such embodiments are intended to fall within the scope of this disclosure.

FIGS. 1-9 illustrate a first embodiment of a knot tying device 10. As is described below, the knot tying device 10 can, for example, be used to tie what are referred to as improved clinch knots. The device 10 is shown assembled in FIGS. 1-5. As is apparent from those figures, the device 10 generally comprises a body 12 and a wheel 14 that is at least partially surrounded by the body. The body 12 and the wheel 14 can, for example, be made of a polymeric material. In some embodiments, the body 12 and wheel 14 are hollow or are made of a buoyant material so that the device 10 will float if dropped in water.

Figure 10:
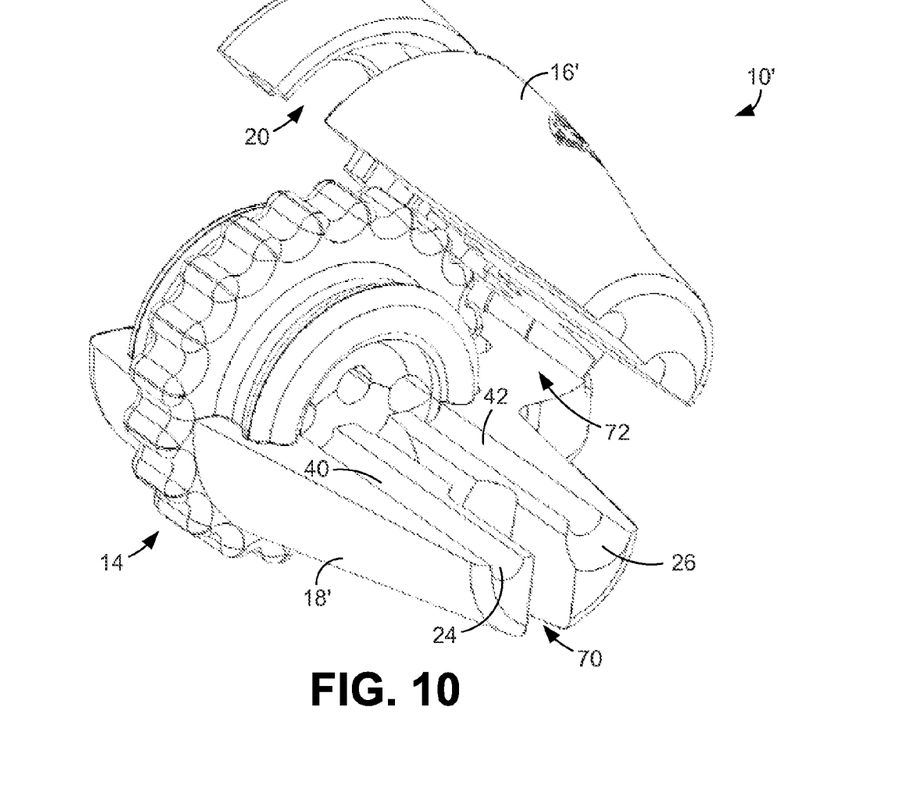
FIG. 10 is a top, front perspective view of a second embodiment of a knot tying device.
Figure 11:
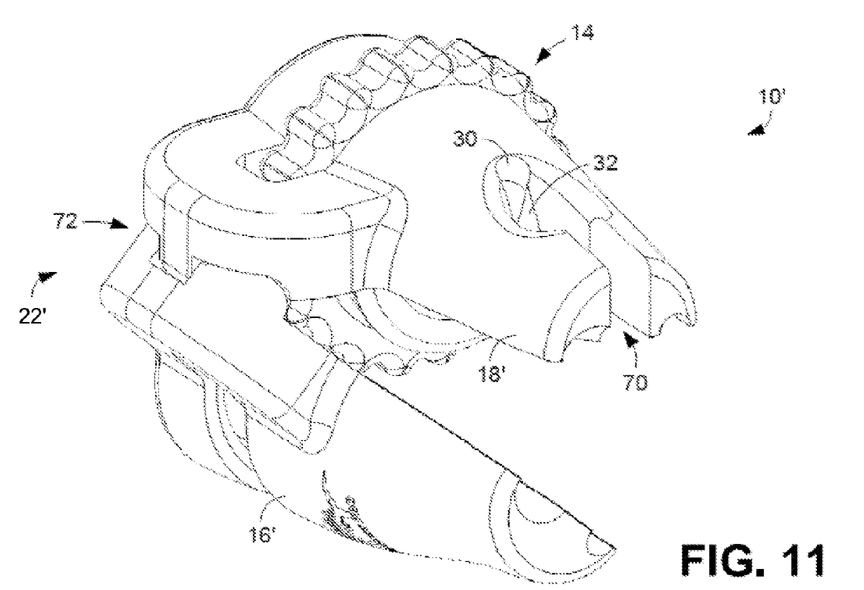
FIG. 11 is a bottom, front perspective view of the knot tying device of FIG. 10.

As is apparent from the figures, the body 12 comprises two independent portions, including a first or top portion 16 and a second or bottom portion 18. The two portions 16, 18 connect together to complete the body 12 and, in some embodiments, form first and second halves of the body. Although the two portions 16, 18 are shown in later figures as being completely separate components, it is noted that, in some embodiments, they can be joined together, for example using a hinge (not shown). An example of such a hinge is shown in FIGS. 10 and 11 and can be readily incorporated into the embodiment shown in FIGS. 1-9. In addition, a closure, such as a latch (not shown), can be used on the opposite side of the hinge to keep the two portions 16, 18 assembled while the device 10 is in use.

When the two portions 16, 18 are assembled as shown in FIGS. 1-5, they form a wheel slot 20 in which the wheel 14 can be positioned. The slot 20 is in part defined by an armature 22 that connects a front end of the device 10 to a rear end of the device. As is apparent from the figures, the outer edge of the wheel 14 is exposed when provided in the slot 20, except for the portion that is surrounded by the armature 22. The outer edge of the wheel 14 can be provided with a surface that enables the user to better grip the wheel when rotating it relative to the body 12. For example, the outer edge of the wheel 14 can be knurled.

Figure 1:
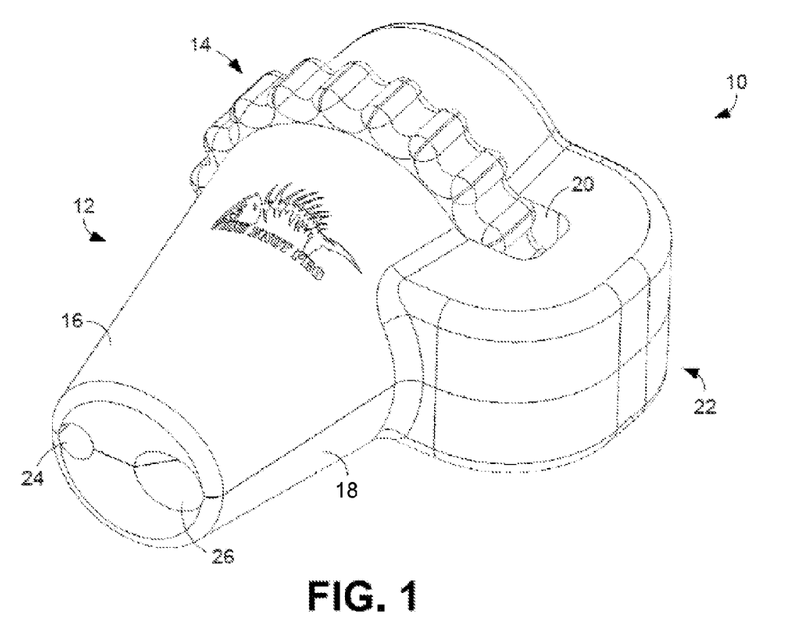
FIG. 1 is a top, front perspective view of a first embodiment of a knot tying device.
Figure 2:
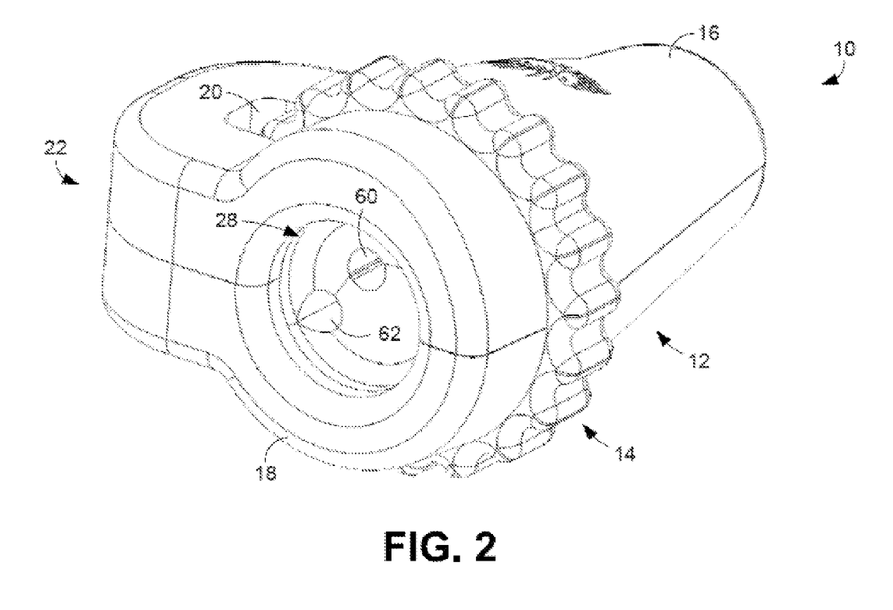
FIG. 2 is a top, rear perspective view of the knot tying device of FIG. 1.
Figure 3:
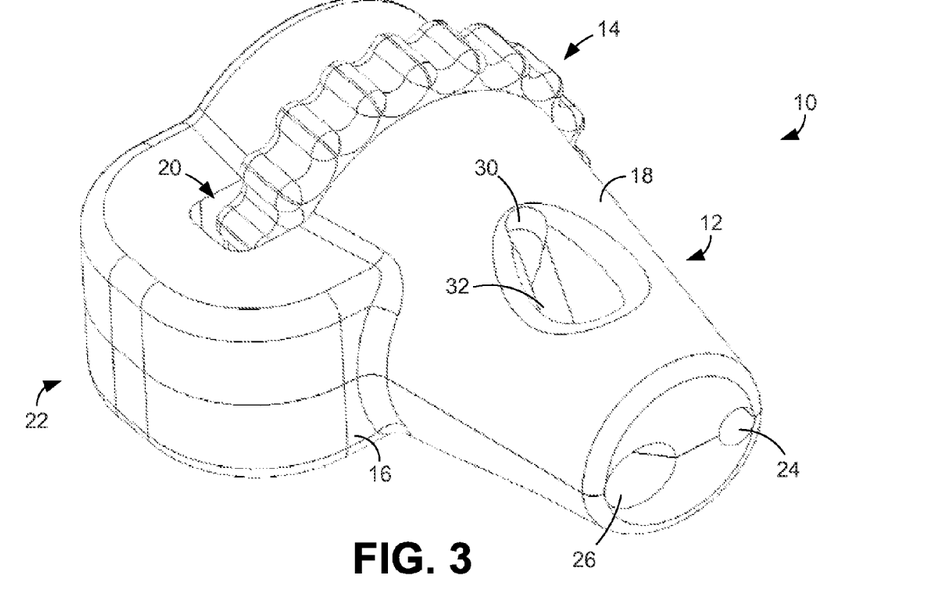
FIG. 3 is a bottom, front perspective view of the knot tying device of FIG. 1.
Figure 4:
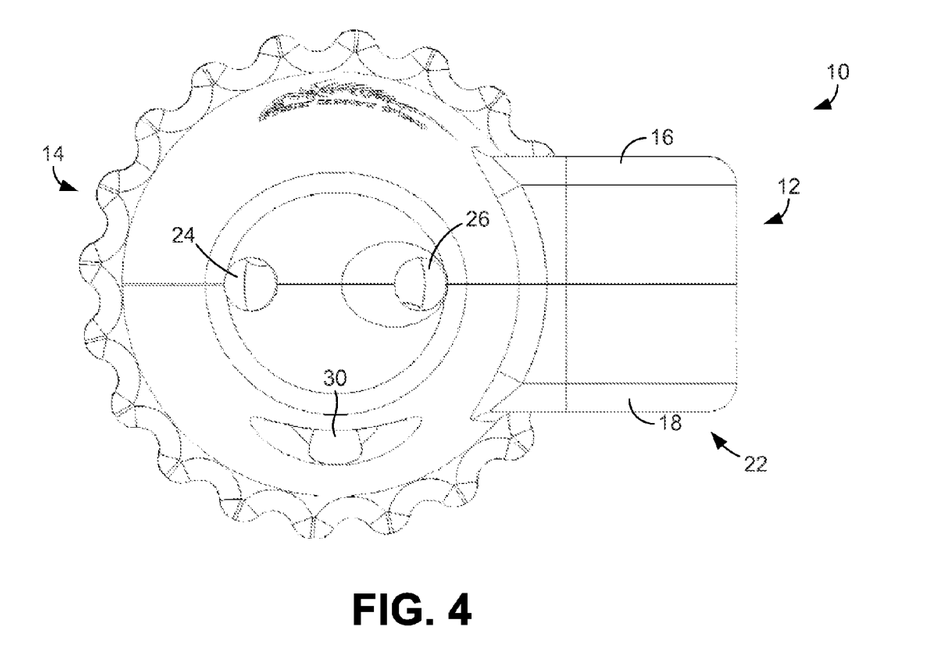
FIG. 4 is a front view of the knot tying device of FIG. 1.
Figure 5:
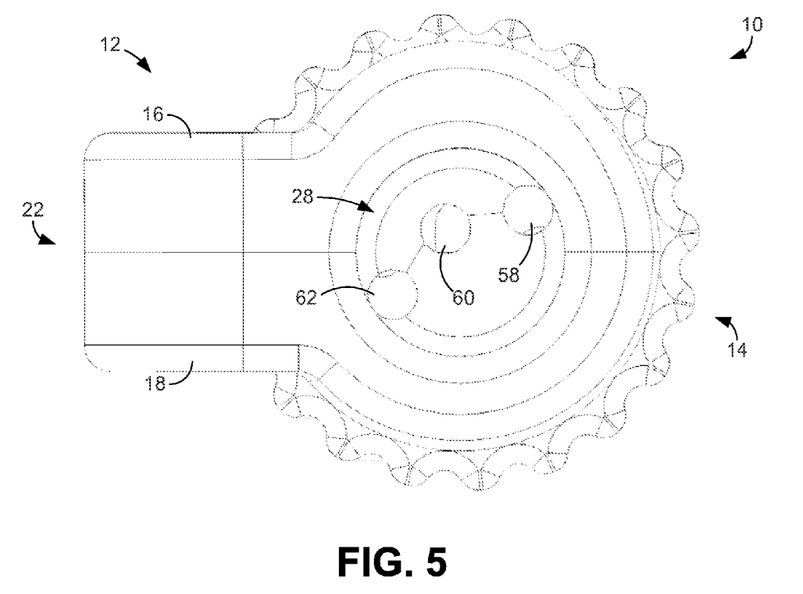
FIG. 5 is a rear view of the knot tying device of FIG. 1.

As is further apparent from FIGS. 1-5, the top and bottom portions 16, 18 of the body 12 together form multiple openings that lead to the interior of the body. As is described below, a strand of material, such as fishing line, can be passed through the openings to tie a knot in the strand. In the illustrated embodiment, the body 12 forms a first opening 24 and a second opening 26 at the front end of the device 10 (FIG. 1), a third opening 28 at the rear end of the device (FIG. 2), and a fourth opening 30 on the bottom side of the device (FIG. 3). As is apparent from FIG. 3, the bottom body portion 18 also forms a groove 32 that extends to or from the opening 30.

Figure 6:
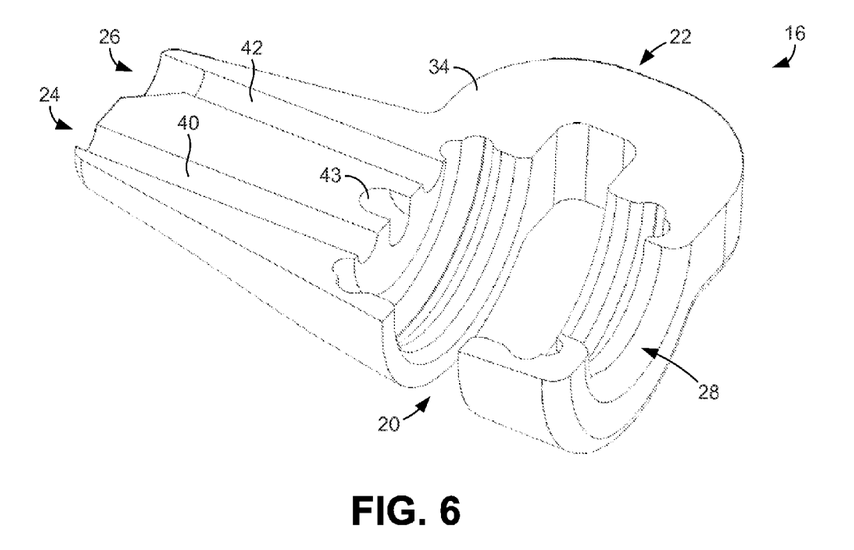
FIG. 6 is a perspective view of a top body portion of the knot tying device of FIG. 1 showing an inner side of the top body portion.
Figure 7:
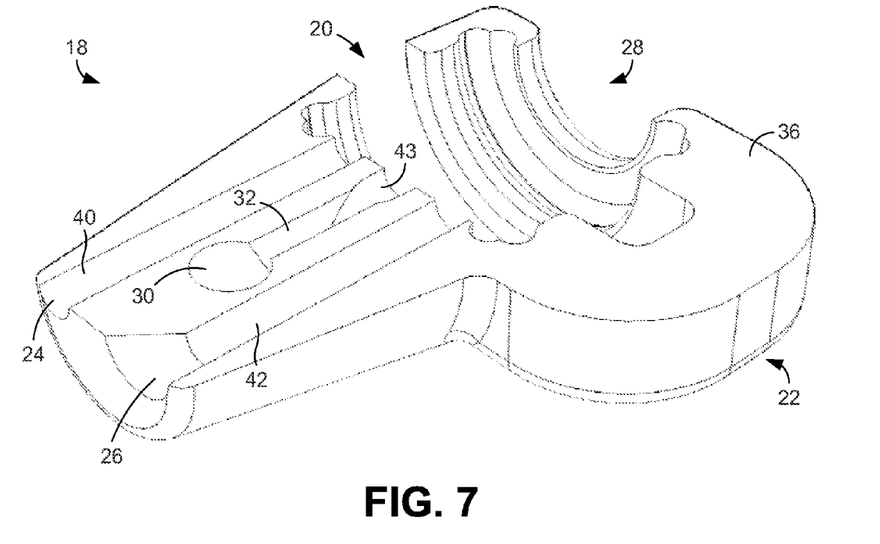
FIG. 7 is a perspective view of a bottom body portion of the knot tying device of FIG. 1 showing an inner side of the top body portion.

The top and bottom body portions 16, 18 can be separated to provide access to the interior of the body 12. When a hinge is provided, the two portions 16, 18 can be separated like a clamshell (see, e.g., FIGS. 10 and 11). FIGS. 6 and 7 show the inner side of each body portion 16, 18, respectively, and therefore reveal the nature of inner passages formed by the body 12. The body portions 16, 18 include generally planar mating surfaces 34, 36 that are placed in contact when the two body portions are connected together. As is apparent from FIGS. 6 and 7, the first opening 24 leads to a first inner passage 40, and the second opening 26 leads to a second inner passage 42. The first and second inner passages 40, 42 are generally parallel to each other and extend along a length direction of the body 12 to the wheel slot 20. The fourth opening 30 and the groove 32 lead to a third inner passage 43 that also extends to the wheel slot 20. As can be appreciated from FIGS. 6 and 7, the wheel slot 20 includes multiple concentric grooves that grip the wheel 14 once it is placed within the slot 20.

Figure 8:
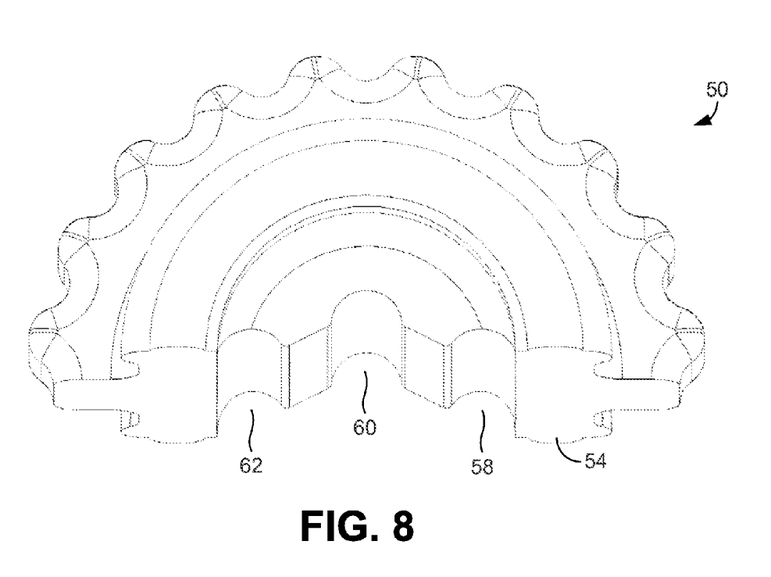
FIG. 8 is a perspective view of a top portion of a wheel of the knot tying device of FIG. 1.
Figure 9:
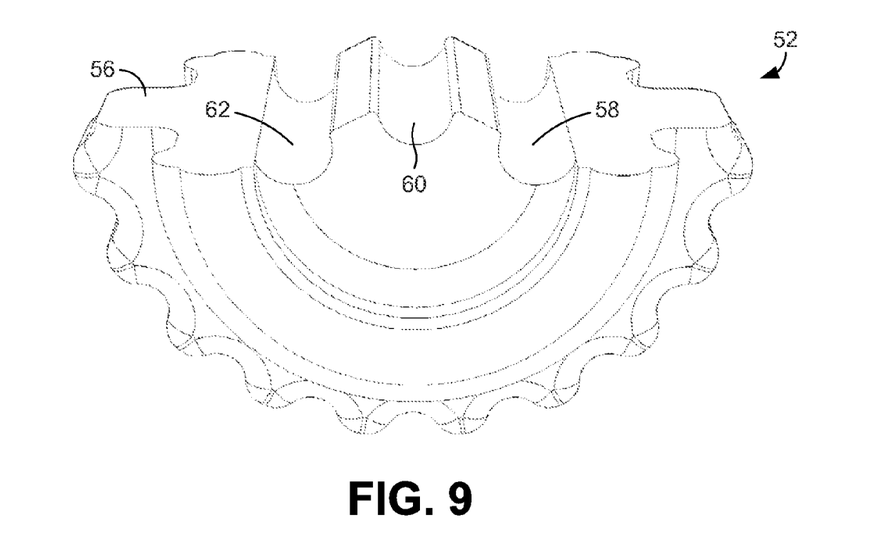
FIG. 9 is a perspective view of a bottom portion of the wheel of the knot tying device of FIG. 1.

Like the body 12, the wheel 14 is composed of two parts, a first or top portion 50 shown in FIG. 8, and a second or bottom portion 52 shown in FIG. 9. The two wheel portions 50, 52 also include generally planar mating surfaces 54, 56 that are brought into contact when the two portions are used to form the complete wheel 14. As shown best in FIG. 5, the wheel 14 includes three openings, including a first (outer) opening 58, a second (central) opening 60, and a third (outer) opening 62. As is apparent from FIGS. 2 and 5, these openings are accessible via the third opening 28 formed at the rear end of the body 12.

The wheel 14 can be assembled when the body 12 is assembled. By way of example, the top portion 50 of the wheel 14 can be slid into in the portion of the slot 20 formed by the top body portion 16 until its mating surface 54 is flush with the mating surface 34 of the top body portion, the bottom portion 52 of the wheel can be slid into in the portion of the slot formed by the bottom body portion 18 until its mating surface 56 is flush with the mating surface 36 of the bottom body portion, and the body 12 can be closed (e.g., like a clamshell). Once the body 12 is closed with the wheel 14 within the wheel slot 20, the wheel can be rotated within the slot as if it were constructed from a single piece of material. Notably, when the wheel 14 is rotated to a position in which its mating surfaces 54, 56 do not align with the mating surfaces 34, 36 of the body portions 16, 18, the body portions cannot be separated.

When the device 10 is to be used to tie an improved clinch knot, a strand of material is passed through the device in two passes, the wheel 14 is rotated through multiple complete turns, the strand is passed through the wheel and the device once again, and the device 10 is then opened to reveal a formed knot. A specific example of tying a fish hook to a fishing line will now be described as an example. Before passing the fishing line into the device 10, the wheel 14 is oriented so that its outer openings 58, 62 are respectively aligned with the first and second inner passages 40, 42 (the wheel shown in FIG. 5 being turned slightly counterclockwise of this orientation). In some embodiments, this can also be the orientation in which the mating surfaces 54, 56 of the wheel 14 are aligned with the mating surfaces 34, 36 of the body portions 16, 18.

The fishing line can first be passed through an outer opening of the wheel 14, such as the first outer opening 58. The line can then be pushed through the first inner passage 40 formed by the body 12 and out of the body through the first opening 24 (see FIG. 6). At this point, the line has been passed through the body from one end to the other. A hook can then be threaded onto the line adjacent the first opening 24. In some embodiments, a support element (not shown) can be provided on the body 12 to support the hook as the line is threaded through the hook.

Next, the line can be passed through the second opening 26, along the second inner passage 42, and out through the other outer opening of the wheel 14 (the second outer opening 62 in this example; see FIG. 5) so that the line has again passed through the body from one end to the other. At this point, the wheel 14 can be turned through multiple complete (i.e., 360°) rotations. By way of example, the wheel 14 is turned through two to four complete rotations. However, a knot can be formed by turning the wheel a greater number of rotations, if desired. This turning twists together the two lengths of the line that have passed through the body 12.

Once the wheel 14 has been returned to its original position, the free end of the line can be passed through the central opening 60 of the wheel. This causes the line to be passed through the third inner passage 43 and out from the opening 30 so as to emerge from the body 12 a third time (this time from the bottom of the body 12). At this point, the body 12 can be opened to separate the two body portions 16, 18 and the two wheel portions 50, 52 they respectively comprise to provide access to a loose improved clinch knot that the device 10 has formed. The knot can then be pulled tight by pulling on the free end of the line.

FIGS. 10 and 11 illustrate a second embodiment of a knot tying device 10'. The device 10' is similar in many ways to the knot tying device 10 illustrated in FIGS. 1-9 and therefore incorporates many of the same components, which are identified using the same reference numerals. These components will not be described again for purposes of brevity. The knot tying device 10' differs from the knot tying device 10 in relation to its bottom body portion 18'. As is apparent from both FIGS. 10 and 11, the bottom body portion 18' comprises an additional slot 70 that extends between the first and second openings 24, 26 from the front end of the bottom body portion to the fourth opening 30. This slot 70 provides access to the strand and enables the user to hold the strand in place within the device as the device is opened.

In addition, the knot tying device 10 further comprises a hinge 72 of the type described above. As shown in FIGS. 10 and 11, the hinge 72 is incorporated into the armature 22' formed by the top and bottom body portions 16', 18'. In some embodiments, the hinge 72 includes a pin (not visible) that defines a pivot axis about which the body portions 16', 18' can pivot when the device 10' is opened and closed.

FIGS. 12-19 illustrate a third embodiment of a knot tying device 100. The knot tying device 100 is similar in many ways to the knot tying device 10 of FIGS. 1-9 except that the device 100 can be used to tie what are referred to as blood knots, which can be used to tie two strands of material together. The device 100 is shown assembled in FIGS. 12 and 13. As is apparent from these figures, the device 100 generally comprises a body 102 and a wheel 104 that is at least partially surrounded by the body. The body 102 comprises two independent portions, including a first or top portion 106 and a second or bottom portion 108. The two portions 106, 108 connect together to complete the body 102 are joined together using a hinge 109 that includes a pin 111. In addition, a closure, such as a latch (not shown), can be used on the opposite side of the hinge 109 to keep the two portions 106, 108 assembled while the device 100 is in use.

Figure 12:
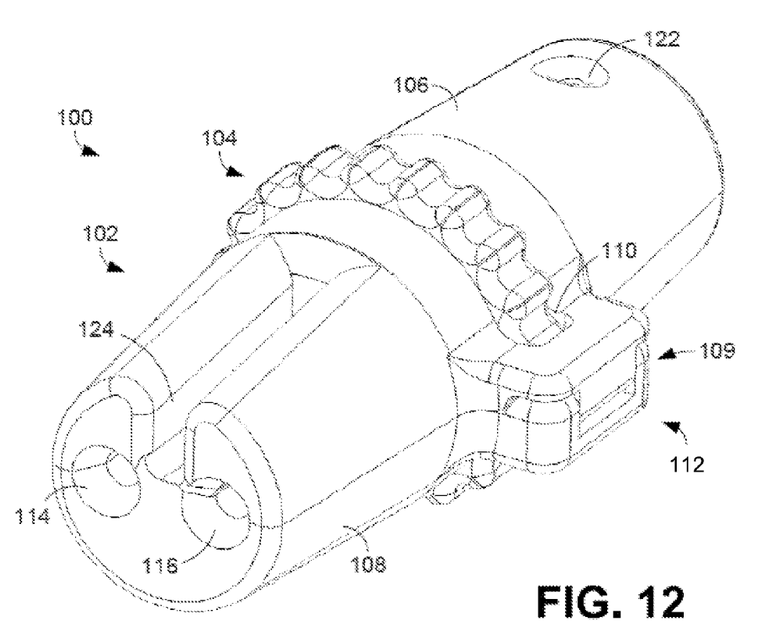
FIG. 12 is a top, front perspective view of a third embodiment of a knot tying device.
Figure 13:
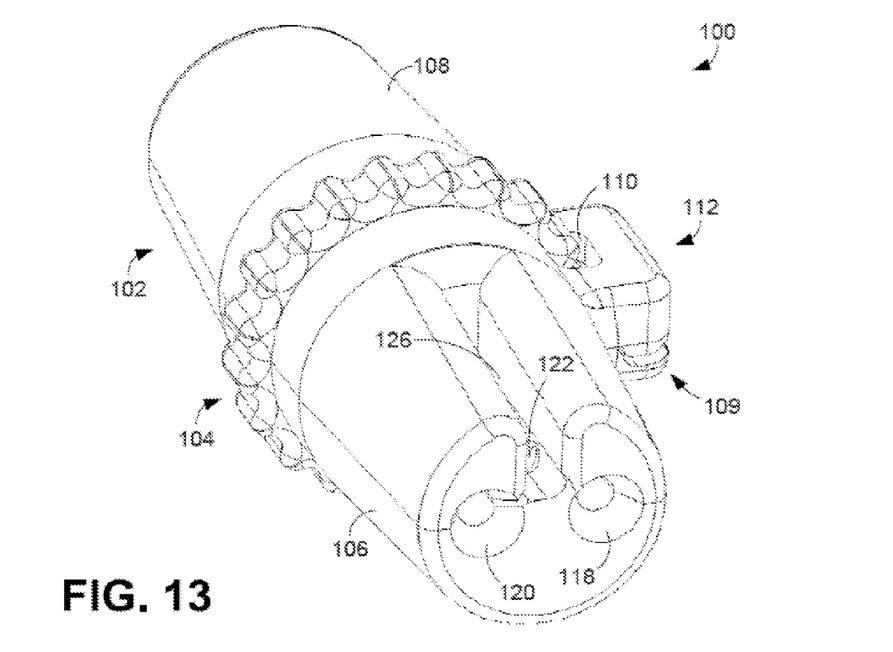
FIG. 13 is a bottom, rear perspective view of the knot tying device of FIG. 12.

When the two portions 106, 108 are joined together as shown in FIGS. 12 and 13, they form a wheel slot 110 in which the wheel 104 can be positioned. The slot 110 is in part defined by an armature 112 that incorporates the hinge 109 and connects a front end of the device 100 to a rear end of the device. As is apparent from the figures, the outer edge of the wheel 14 is exposed when provided in the slot 110, except for the portion that is surrounded by the armature 112. The outer edge of the wheel 104 can be provided with knurls that enable the user to better grip the wheel when rotating it relative to the body 102.

As is further apparent from FIGS. 12 and 13, the top and bottom portions 106, 108 of the body 102 together form multiple openings that lead to the interior of the body. As is described below, strands of material, such as fishing lines, can be passed through the openings to tie the strands together. In the illustrated embodiment, the body 102 forms a first opening 114 and a second opening 116 at the front end of the device 100 (FIG. 12), a third opening 118 and a fourth opening 120 at the rear end of the device (FIG. 13), and a fifth opening 122 on the top side of the device (FIG. 12). As is also shown in the figures, the body 102 defines two elongated slots, including a first slot 124 positioned at the front end of the body and extending between the first and second openings 114, 116 (FIG. 12), and a second slot 126 positioned at the rear end of the body and extending between the third and fourth openings 118, 120 (FIG. 13).

The top and bottom body portions 106, 108 can be separated to provide access to the interior of the body 102. FIGS. 14-17 show the inner side of each body portion 106, 108, and therefore reveal the nature of inner passages formed by the body 102. The portions 106, 108, include generally planar mating surfaces 130, 132 that are placed in contact when the two portions are connected together. The first opening 114 leads to a first inner passage 134 and the second opening 116 leads to a second inner passage 136. As is apparent from FIGS. 14-17, the first and second inner passages 134, 136 are generally parallel to each other and extend along a length direction of the body 102 from its front end to the wheel slot 110. The third opening 118 leads to a third inner passage 138 and the fourth opening 120 leads to a fourth inner passage 140. The third and fourth inner passages 138, 140 are also generally parallel to each other and extend along the length direction of the body 102 from its rear end to the wheel slot 110. As can be appreciated from FIGS. 14-17, the wheel slot 110 includes multiple concentric grooves that grip the wheel 104 once it is placed within the slot 110.

With further reference to FIGS. 14-17, the first slot 124 extends to a fifth inner passage 142 formed in the top body portion 106 and the second slot 126 extends to a six inner passage 144 formed in the bottom body portion.

Figure 18:
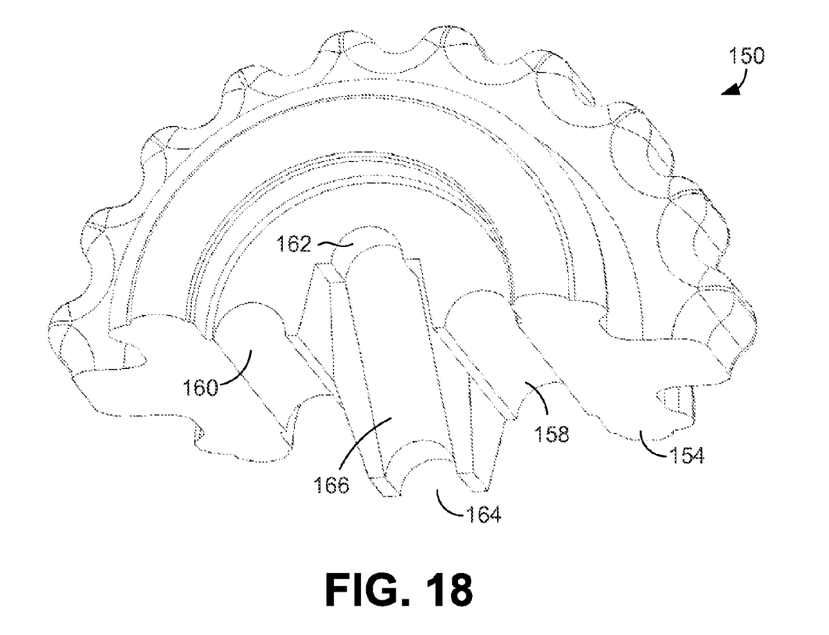
FIG. 18 is a perspective view of a top portion of a wheel of the knot tying device of FIG. 12.
Figure 19:
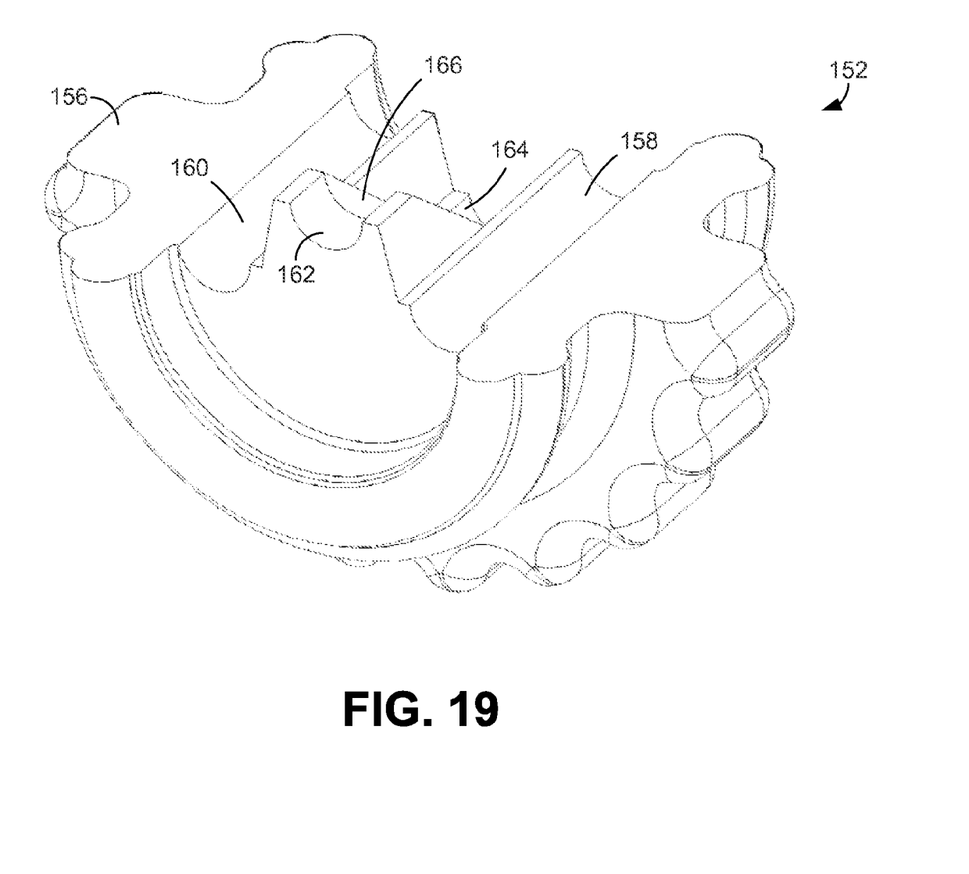
FIG. 19 is a perspective view of a bottom portion of the wheel of the knot tying device of FIG. 12.

Like the body 102, the wheel 104 is composed of two portions, a first or top portion 150 shown in FIG. 18, and a second or bottom portion 152 shown in FIG. 19. In some embodiments, the two wheel portions 150, 152 are substantially identical. The two wheel portions 150, 152 also include generally planar mating surfaces 154, 156 that are brought into contact when the two portions are used to form the complete wheel 104. When the wheel 104 is formed by the two wheel portions 150, 152 (i.e., by sliding the wheel portions into the wheel slot portions formed by the top and bottom body portions 106, 108), the wheel includes first and second outer openings 158 and 160, a top opening 162, a bottom opening 164, and a diagonal passage 166 that extends between the top and bottom openings.

Figure 14:
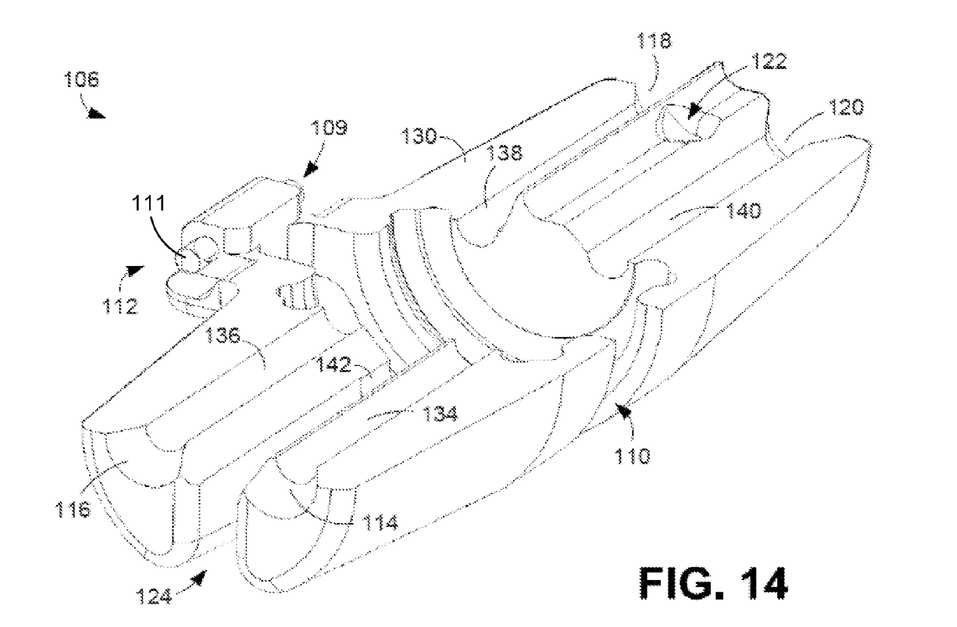
FIG. 14 is a first perspective view of a top body portion of the knot tying device of FIG. 12 showing an inner side of the top body portion.
Figure 15:
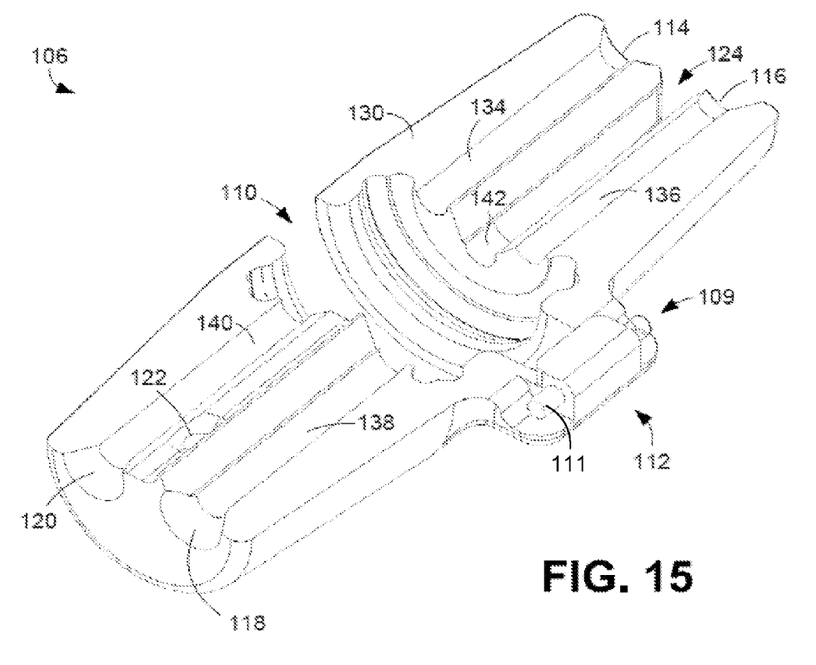
FIG. 15 is a second perspective view of the top body portion of the knot tying device of FIG. 12 showing an inner side of the top body portion.
Figure 16:
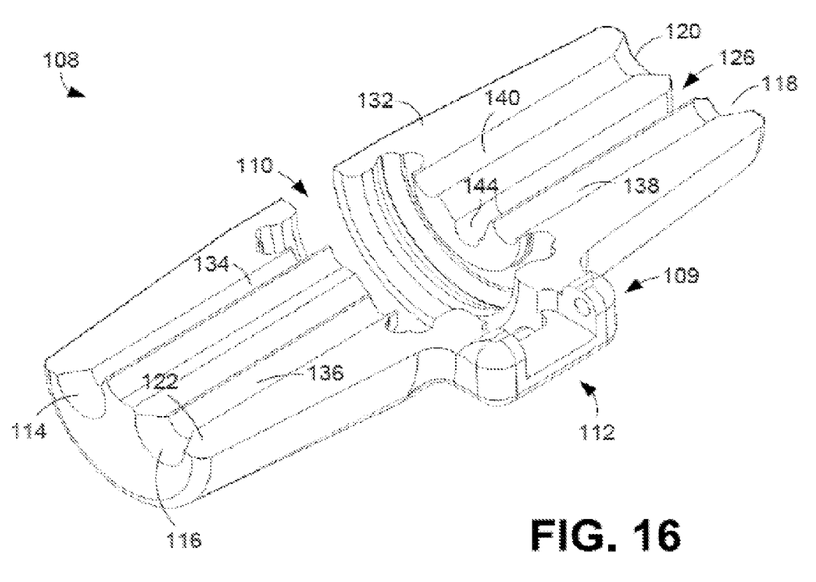
FIG. 16 is a first perspective view of a bottom body portion of the knot tying device of FIG. 12 showing an inner side of the bottom body portion.
Figure 17:
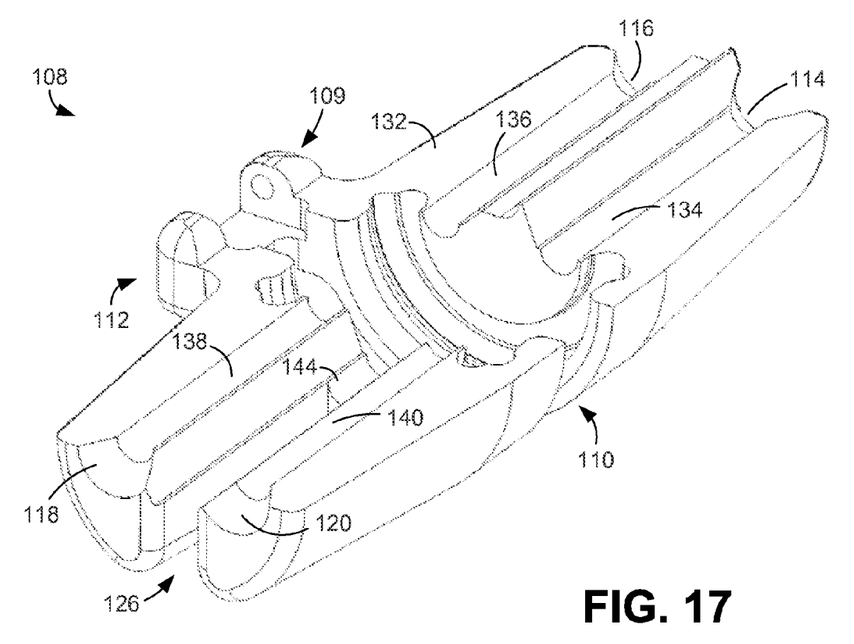
FIG. 17 is a second perspective view of the bottom body portion of the knot tying device of FIG. 12 showing an inner side of the bottom body portion.

When the device 100 is to be used to tie a blood knot, two strands of material are passed through the device from opposing ends, the wheel 104 is rotated through multiple complete turns, the two strands are then passed through the device once again through another path from opposite directions, and the device is opened to reveal a formed knot. A specific example of tying two lengths of fishing line together will now be described as an example. With reference to FIG. 14, a first line is passed through the first opening 114, along the first inner passage 134, through an outer opening (e.g., the first outer opening 158) of the wheel 104, through the fourth inner passage 140, and out of the body 102 through the fourth opening 120. In addition, a second line is passed through the third opening 118 at the opposite end of the body 102, along the third inner passage 138, through the other outer opening (e.g., the second outer opening or 160) of the wheel 104, through the second inner passage 136, and out of the body 102 through the second opening 116. At this point, each line has been passed through the body 102 and the wheel 104 once from opposite ends of the body.

Next, the wheel 104 can be turned through multiple complete rotations. By way of example, the wheel 104 is turned through two to four complete rotations. However, a knot can be formed by turning the wheel 104 a greater number of rotations, if desired. Once the wheel 104 has returned to its original position, the first line can be passed through the first slot 124, through the fifth inner passage 142, through the diagonal passage 166 of the wheel 104, through the sixth inner passage 144, and out through the second slot 126. In similar matter, the second line can be passed through the second slot 126, through the sixth inner passage 144, through the diagonal passage 166 of the wheel 104, through the fifth inner passage 142, and out through the first slot 124, such that the two lines traverse the same path formed by the body 102 and the wheel 104 but from different directions.

At this point, the body 102 can be opened to separate the two body portions 106, 108 and the two wheel portions 150, 152 they respectively comprise to provide access to a loose blood knot that the device 100 has formed. Then, the knot can be pulled tight by pulling on the two lengths of line.

Various modifications can be made to the disclosed devices. For example, a resilient member, such as a rubber element or polymeric bristles, can be positioned between the body and the wheel of the devices to ensure that strands of material passed through the devices' parts do not become snagged.

The invention claimed is:

1. A knot tying device comprising:
    a body that defines a wheel slot and multiple inner passages enclosed within the body that lead to and open into the wheel slot; and
    a wheel that fits and can be rotated within the wheel slot, the wheel including openings that can be aligned with the inner passages of the body;
    wherein one or more strands of material can be fed through the inner passages of the body and the openings of the wheel and the wheel can then be rotated relative to the body to twist the one or more stands.

2. The device of claim 1, wherein the wheel slot of the body comprises concentric grooves that hold the wheel within the slot.

3. The device of claim 1, wherein the body comprises two generally parallel inner passages that extend to one of its ends.

4. The device of claim 1, wherein the body comprises a first body portion and a second body portion that form first and second halves of the body.

5. The device of claim 4, wherein the body further comprises a hinge that connects the first body portion to the second body portion and wherein the body can be opened and closed like a clamshell using the hinge.

6. The device of claim 1, wherein the body comprises openings at one end that lead to the inner passages.

7. A device for tying a knot in a strand of material, the device comprising:
- a body that defines a wheel slot and three inner passages that lead to the wheel slot; and
- a wheel that fits and can be rotated within the wheel slot, the wheel including three openings that can be aligned with the three inner passages;
- wherein the strand can be fed through a first opening of the wheel and a first inner passage of the body and then through a second inner passage of the body and a second opening of the wheel, the wheel can then be rotated relative to the body to twist the strand about itself, and the strand can be fed through a third opening of the wheel and third inner passage of the body to form the knot.

8. The device of claim 7, wherein the wheel slot of the body comprises concentric grooves that hold the wheel within the slot.

9. The device of claim 7, wherein the body comprises a first body portion and a second body portion that form first and second halves of the body.

10. The device of claim 9, wherein the body further comprises a hinge that connects the first body portion to the second body portion and wherein the body can be opened and closed like a clamshell using the hinge.

11. The device of claim 7, wherein the first and second openings are provided at an end of the body and the third opening is provided on a top or bottom side of the body.

12. A device for tying two strands of material together, the device comprising:
- a body that defines a wheel slot and six inner passages that lead to the wheel slot; and
- a wheel that fits and can be rotated within the wheel slot, the wheel including three openings that can be aligned with the six inner passages;
- wherein two strands of material can passed through the body and the wheel from opposite ends of the body, the wheel can be rotated through multiple complete turns, and the strands can each passed through the body once again along the same path but in opposite directions to form a knot that ties the strands together.

13. The device of claim 12, wherein the wheel slot of the body comprises concentric grooves that hold the wheel within the slot.

14. The device of claim 12, wherein the body comprises a first body portion and a second body portion that form first and second halves of the body.

15. The device of claim 14, wherein the body further comprises a hinge that connects the first body portion to the second body portion and wherein the body can be opened and closed like a clamshell using the hinge.

16. The device of claim 12, wherein the body comprises first, second, third, and fourth openings provided at ends of the device that lead to the first, second, third, and fourth inner passages.

17. The device of claim 16, wherein the body further comprises first and second slots that lead to fifth and sixth inner passages, the first slot extending between the first and second openings and the second slot extending between the third and fourth openings.

18. A method for tying a knot, the method comprising:
- passing one or more strands of material through one or more inner passages formed in a body of a knot tying device and through one or more openings formed in a wheel provided within the body;
- turning the wheel relative to the body to twist the one or more strands;
- passing the one or more strands through another opening formed in the wheel and another inner passage formed in the body; and
- separating the body and the wheel into two portions to remove a knot formed by the device.

19. A method for tying a knot, the method comprising:
- passing one or more strands of material through one or more inner passages formed in a body of a knot tying device and through one or more openings formed in a wheel provided within the body;
- turning the wheel relative to the body to twist the one or more strands;
- passing the one or more strands through another inner passage formed in the body and another opening formed in the wheel; and
- separating the body and the wheel into two portions to remove a knot formed by the device.

* * * * *